United States Patent Office 3,098,853
Patented July 23, 1963

3,098,853
N-ACYLATED DERIVATIVES OF 4-AMINO-2-CARBOCYCLIC-3-METHYLMORPHOLINES
Max J. Kalm, Skokie, Ill., assignor to G. D. Searle & Co., Chicago, Ill., a corporation of Delaware
No Drawing. Filed June 14, 1961, Ser. No. 116,975
9 Claims. (Cl. 260—247.1)

The present invention is concerned with novel acyl derivatives of heterocyclic hydrazines and, more particularly, with N-acyl derivatives of 4-amino-2-carbocyclic-3-methylmorpholines of the structural formula

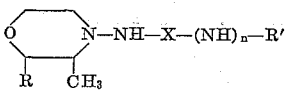

wherein R is a 6-membered carbocycle, R' is selected from the group consisting of pyridyl, 5-methyl-3-isoxazolyl, and hydrocarbon radicals of less than 9 carbon atoms optionally substituted by halo, lower alkoxy, and (lower alkanoyl)amido groups, X is a carbonyl or sulfonyl group, and $n$ is 0 or 1.

The hydrocarbon radicals which R' represents are exemplified by methyl, ethyl, propyl, butyl, pentyl, hexyl, the branched-chain isomers thereof, phenyl, benzyl, phenethyl, tolyl, and cyclohexyl.

Suitable starting materials for the manufacture of the compounds of this invention are the substituted 4-aminomorpholines of the structural formula

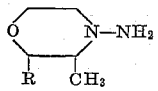

wherein R is as identified supra, which are prepared by nitrosation of the corresponding substituted morpholines followed by reduction of the resulting N-nitroso compounds, as is described in my copending application, Serial No. 104,217, filed April 20, 1961. Acylation of these intermediates with a carboxylic acid chloride or sulfonic acid chloride affords the carboxamido- and sulfonamidomorpholines of the present invention. This process is exemplified by the reaction of 4-amino-3-methyl-2-phenylmorpholine with p-anisoyl chloride in the presence of pyridine to afford 4-(p-anisamido)-3-methyl-2-phenylmorpholine as well as the reaction of that substituted aminomorpholine with p-acetamidobenzenesulfonyl chloride and pyridine to yield 4-(p-acetamidobenzenesulfonamido) - 3-methyl-2-phenylmorpholine. An alternate process for the manufacture of these compounds involves reaction of the free carboxylic or sulfonic acid with the substituted aminomorpholine in the presence of a dehydrating agent such as a disubstituted carbodiimide. Typically, 4-amino-3-methyl-2-phenylmorpholine is allowed to react with phenylacetic acid in the presence of dicychlohexylcarbodiimide to produce 3 - methyl-2-phenyl-4-phenylacetamidomorpholine. A third process particularly suitable for the manufacture of the instant carboxamido-morpholines involves reaction of the carboxylic acid with ethyl chloroformate in the presence of an acid acceptor such as triethylamine to afford the mixed anhydride, which is then treated with the appropriate amino-morpholine. For example, 5-methyl-3-isoxazole carboxylic acid is allowed to react with ethyl chloroformate in the presence of triethyl- amine to yield the mixed anhydride, which is treated with 4-amino-3-methyl-2-phenylmorpholine in a suitable solvent medium, resulting in 3-methyl-4-(5'-methylisoxazole-3'-carboxamido)-2-phenylmorpholine.

Reaction of the aforementioned substituted 4-aminomorpholines with the appropriate isocyanates results in the corresponding instant substituted morpholin-4-ylureas. Typically, a solution of 4-amino-3-methyl-2-phenylmorpholine and p-chlorophenyl isocyanate in ether is heated at the reflux temperature to afford N-(2-phenyl-3-methylmorpholin-4-yl)-N'-p-chlorophenylurea.

The compounds of this invention exhibit valuable antibacterial and anti-fungal properties as is evidenced, for example, by their inhibitory action on the growth of *Diplococcus pneumoniae* and *Trichophyton mentagrophytes*. In addition, the instant substituted morpholin-4-ylureas and substituted carboxamidomorpholines display valuable pharmacological properties. They are, for example, anorectic, hypotensive, anti-inflammatory, and cholesterol synthesis inhibitory agents.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.). Quantities of materials are expressed in parts by weight unless otherwise noted.

*Example 1*

To a solution of 1.92 parts of 4-amino-3-methyl-2-phenylmorpholine and 1.36 parts of phenylacetic acid in 67 parts of methylene chloride is added a solution of 2.27 parts of dicyclohexylcarbodiimide in 26.8 parts of methylene chloride, and the resulting mixture is allowed to stand at room temperature for about one hour. The precipitate of dicyclohexylurea is removed by filtration, and the filtrate is evaporated to dryness to afford a yellow solid. Recrystallization of this solid from absolute ethanol affords white needles of 3-methyl-2-phenyl-4-phenylacetamidomorpholine, M.P. about 153–154.5°. This substance is represented by the formula

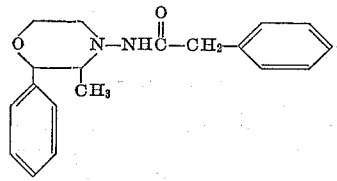

*Example 2*

To a solution of 3.84 parts of 4-amino-3-methyl-2-phenylmorpholine and 3 parts of hydrocinnamic acid in 134 parts of methylene chloride is added a solution of 4.54 parts of dicyclohexylcarbodiimide in 67 parts of methylene chloride, and the reaction mixture is stored at room temperature for about 2 hours, then is filtered to remove the precipitated dicyclohexylurea. The solvent is removed from the filtrate by evaporation on the steam bath. The oily residue is dissolved in butanone and treated with isopropanolic hydrogen chloride, then with ether to afford 3 - methyl-2-phenyl - 4 - (β-phenylpropionamido)morpholine hydrochloride. Recrystallization from butanone-ether produces the pure hydrochloride.

The aforementioned hydrochloride is dissolved in water and treated with dilute aqueous sodium hydroxide. The resulting aqueous mixture is extracted with chloroform, and the organic layer is separated, dried over anyhdrous sodium sulfate, and evaporated to dryness to yield the crystalline free base, 3-methyl-2-phenyl-4-(β-phenylpropionamido)morpholine, M.P. about 119–121°, which is represented by the formula

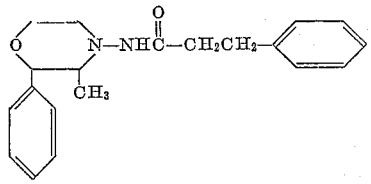

*Example 3*

To a solution of 9.6 parts of 4-amino-3-methyl-2-phenylmorpholine in 49 parts of pyridine is added 7.02 parts of benzoyl chloride. When the initial exothermic reaction subsides, the reaction mixture is heated on the steam bath for about 30 minutes, then is stripped of excess pyridine by distillation at reduced pressure. The solid residue is treated with about 75 parts of water, then is made alkaline by the addition of dilute aqueous sodium hydroxide. The resulting solid product is collected by filtration, washed with water, and dried to produce 4-benzamido-3-methyl-2-phenylmorpholine. Recrystallization from absolute ethanol affords white needles of the pure product, melting at about 211–213°. This compound is represented by the formula

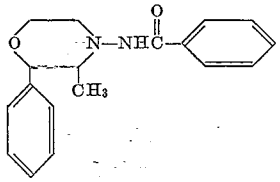

*Example 4*

By substituting 8.5 parts of p-anisoyl chloride in the process of Example 3, 4-(p-anisamido)-3-methyl-2-phenylmorpholine is obtained. Recrystallization of this product from absolute ethanol affords white needles of the pure substance melting at about 193.5–194.5°. This substance is represented by the formula

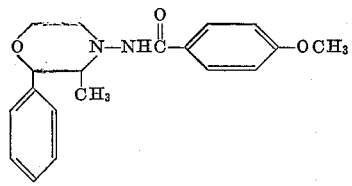

*Example 5*

The substitution of 8.7 parts of p-chlorobenzoyl chloride for benzoyl chloride in the process of Example 3 results in 4-(p-chlorobenzamido)-3-methyl-2-phenylmorpholine. This substance is recrystallized from benzene to yield light tan needles of the pure material, M.P. about 197–199.5°. Its structure is represented by the formula

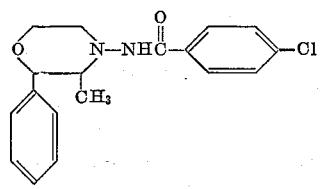

*Example 6*

The substitution of 10.98 parts of m-bromobenzoyl chloride for benzoyl chloride in the procedure of Example 3 results in 4-(m-bromobenzamido)-3-methyl-2-phenylmorpholine. This product is recrystallized from absolute ethanol to afford the pure material, which melts at about 214.5–216°. It is represented by the formula

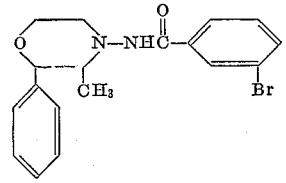

*Example 7*

By substituting 7.32 parts of cyclohexylcarbonyl chloride and otherwise proceeding according to the processes of Example 3, 4-cyclohexylcarboxamido-3-methyl-2-phenylmorpholine is obtained. This substance is recrystalized from absolute ethanol to yield white needles of the pure compound, which displays a melting point of about 209–210.5°. Its structural formula is illustrated below.

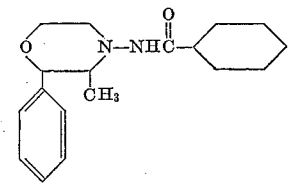

*Example 8*

To a solution of 9.6 parts of 4-amino-3-methyl-2-phenylmorpholine in 49 parts of pyridine is added 8.5 parts of o-anisoyl chloride. After the initial exothermic reaction subsides, the reaction mixture is heated on the steam bath for about 30 minutes, then is stripped of excess pyridine at reduced pressure. The resulting residue is treated with about 75 parts of water, then with dilute aqueous sodium hydroxide. The resulting viscous oily product is extracted with chloroform, and the organic layer is separated, washed with water, dried over anhydrous potassium carbonate, and treated with decolorizing carbon. The decolorized organic solution is stripped of solvent at reduced pressure, and the residual oil is triturated with hexane to afford 4-(o-anisamido)-3-methyl-2-phenylmorpholine as an oil. Its structure is illustrated by the following formula

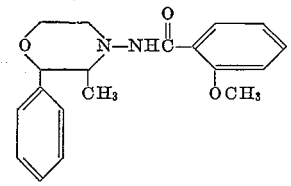

*Example 9*

A solution of 5.46 parts of 3-carboxy-5-methylisoxazole in 241.2 parts of methylene chloride is cooled to about −5°, then is treated successively, by dropwise addition with stirring, with 4.34 parts of triethylamine and 5.15 parts of ethyl chloroformate over a period of about 22 minutes. The resulting mixture is stirred at −5° for about 30 minutes, then is treated by dropwise addition over a period of about 15 minutes with a solution of 8.25 parts of 4-amino-3-methyl-2-phenylmorpholine in 26.8 parts of methylene chloride. The resulting yellow reaction mixture is stirred at −5° for about 30 minutes, allowed to warm to room temperature, then stored at room temperature for about 16 hours. The solvent is removed by evaporation at reduced pressure, and the yellow solid residue is triturated with ether, then collected by filtration. This solid is extracted with benzene, and the benzene extract is evaporated to dryness at reduced pressure. This crude product is recrystallized twice from absolute ethanol to afford white needles of 3-methyl-4-(5'-methylisoxazole-3'-carboxamido)-2-phenylmorpholine, melting at about 165–166°. It is represented by the following structural formula

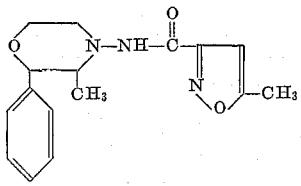

*Example 10*

To a suspension of 8.9 parts of isonicotinoyl chloride hydrochloride in 49 parts of pyridine is added a solution of 9.6 parts of 4-amino-3-methyl-2-phenylmorpholine in 49 parts of pyridine. The initial exothermic reaction is allowed to subside, and the reaction mixture is heated on the steam bath for about 30 minutes, then stripped of pyridine by distillation at reduced pressure. The residue is suspended in about 75 parts of water, and this mixture is made alkaline by the addition of dilute aqueous sodium hydroxide. The resulting product is extracted with chloroform, and the organic layer is separated, washed with water, then dried and decolorized with a mixture of anhydrous potassium carbonate and decolorizing carbon. The resulting solution is evaporated to dryness at reduced pressure, and the solid product is triturated with hexane to remove small amounts of residual pyridine. Recrystallization of this crude product from benzene produces white flakes of 4-isonicotinamido-3-methyl-2-phenylmorpholine, M.P. about 209–211°, which is represented by the structural formula

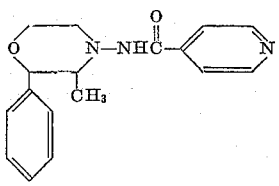

*Example 11*

The reaction of 14.85 parts of 4-amino-2-cyclohexyl-3-methylmorpholine and 13.35 parts of isonicotinoyl chloride hydrochloride by the procedure of Example 10 results in 2-cyclohexyl-4-isonicotinamido-3-methylmorpholine, which melts at about 155–157°. This substance is represented by the following formula

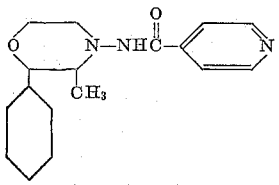

*Example 12*

By substituting 9.08 parts of o-ethoxybenzoyl chloride and otherwise proceeding according to the processes of Example 8, 4-(o-ethoxybenzamido)-3-methyl-2-phenylmorpholine is obtained. Its structure is represented by the following formula

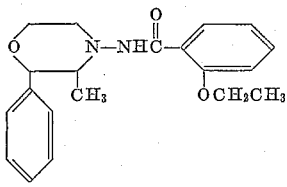

*Example 13*

To a solution of 9.6 parts of 4-amino-3-methyl-2-phenylmorpholine in 49 parts of pyridine is added 8.84 parts of benzenesulfonyl chloride, and the initial exothermic reaction is allowed to subside, whereupon the reaction mixture is heated on the steam bath for about 30 minutes, then stripped of excess pyridine at reduced pressure. Treatment of the residue with about 75 parts of water and sufficient dilute aqueous sodium hydroxide to render the mixture basic results in separation of the oily product, which is extracted into chloroform. The chloroform layer is separated, washed with water, dried over anhydrous sodium sulfate, and treated with decolorizing carbon. The resulting solution is concentrated at reduced pressure to afford a dark brown oil, which is triturated with hexane to yield the solid product. Recrystallization of this crude solid from benzene results in light tan crystals of 4-benzenesulfonamido-3-methyl-2-phenylmorpholine, M.P. about 164–166° (dec.). This product is illustrated by the structural formula

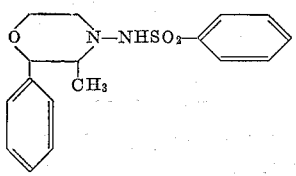

*Example 14*

By substituting 9.56 parts of p-toluenesulfonyl chloride for benzenesulfonyl chloride in the process of Example 13, 3-methyl-2-phenyl-4-(p-toluenesulfonamido)morpholine is obtained. Recrystallization from benzene affords white needles of the pure substance melting at about 153–154°. Its structure is represented by the following formula

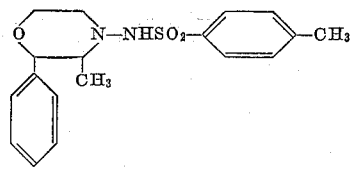

*Example 15*

The substitution of 11.7 parts of p-acetamidobenzenesulfonyl chloride for benzenesulfonyl chloride in the procedure of Example 13 results in 4-(p-acetamidobenzenesulfonamido)-3-methyl-2-phenylmorpholine. The product can be recrystallized from absolute ethanol to yield white needles of the pure substance, which melts at about 208° with immediate decomposition. Its structure is represented by the following formula

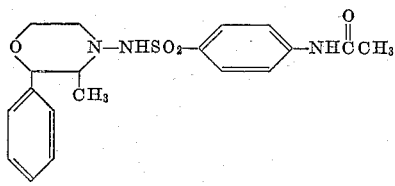

*Example 16*

A solution of 5 parts of 4-amino-3-methyl-2-phenylmorpholine and 3.21 parts of phenyl isocyanate in 237 parts of anhydrous ether is heated at reflux for about one hour, then cooled to room temperature. The resulting crystalline precipitate is collected by filtration, washed with ether, and dried to yield N-(3-methyl-2-phenylmorpholin-4-yl)-N'-phenylurea as a white crystalline solid, melting at about 191–194°. Its structural formula is illustrated as follows

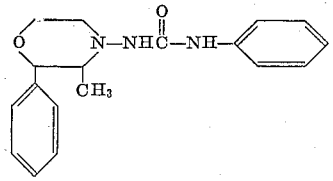

Example 17

The substitution of 4.15 parts of o-chlorophenyl isocyanate for phenyl isocyanate in the process of Example 16 results in N-(3-methyl-2-phenylmorpholin-4-yl)-N'-o-chlorophenylurea, obtained as a white crystalline solid. It displays a melting point of about 180–181.5°, and is represented by the structural formula

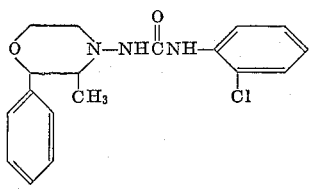

Example 18

A solution of 5 parts of 4-amino-3-methyl-2-phenylmorpholine and 5.35 parts of p-bromophenyl isocyanate in 237 parts of anhydrous ether is heated at reflux for about 2 hours, then concentrated at reduced pressure. The crystalline product which separates is collected by filtration and extracted with hot benzene. Removal of benzene from the filtrate by distillation at reduced pressure produces the white crystalline product, N-(3-methyl-2-phenylmorpholin-4-yl)-N'-p-bromophenylurea, melting at about 202–205°. Its structure is represented by the formula

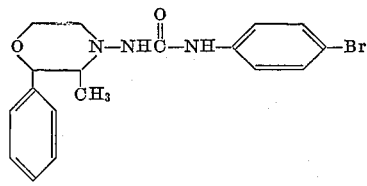

Example 19

A solution of 5 parts of 4-amino-3-methyl-2-phenylmorpholine and 4.15 parts of m-chlorophenyl isocyanate in 237 parts of anhydrous ether is heated at reflux for about 1½ hours, then allowed to stand at room temperature for about 16 hours. The solvent is evaporated to afford a yellow oil, which is first triturated with hexane, then crystallized from absolute ether. The resulting white solid is extracted with a mixture of benzene and chloroform, and the extract is evaporated to dryness at reduced pressure to yield an oil, which crystallizes on standing. This crystalline product, N-(3-methyl-2-phenylmorpholin-4-yl) - N' - m-chlorophenylurea, exhibits a melting point of about 134–151° and is represented by the following formula

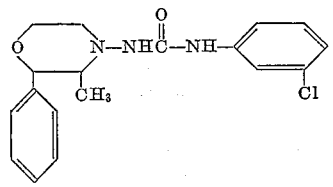

Example 20

A solution of 5 parts of 4-amino-3-methyl-2-phenylmorpholine and 4.15 parts of p-chlorophenyl isocyanate in 237 parts of anhydrous ether is heated at reflux for about 1½ hours. The reaction mixture is cooled to room temperature and the resulting crystalline product is collected by filtration, then extracted with hot benzene. The benzene extract is concentrated at reduced pressure to afford N - (2-phenyl-3-methylmorpholin-4-yl)-N'-p-chlorophenylurea as a white crystalline solid, melting at about 191–194°. Its structural formula is shown below

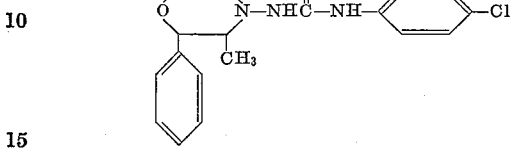

Example 21

A solution of 5 parts of 4-amino-3-methyl-2-phenylmorpholine and 1.92 parts of ethyl isocyanate in 158 parts of anhydrous ether is heated at reflux for about 2 hours. The solvent is removed by distillation on the steam bath, and the residual oil crystallizes upon standing. Trituration of this solid with hot hexane affords N-(3-methyl-2-phenylmorpholin-4-yl)-N'-ethylurea as a white crystalline solid, M.P. about 154–157°. Its structure is represented by the following formula

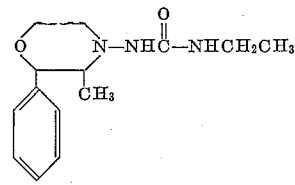

Example 22

The substitution of 2.3 parts of n-butyl isocyanate in the procedure of Example 21 results in N-(3-methyl-2-phenylmorpholin-4-yl)-N' - n - butylurea, which is represented by the structural formula

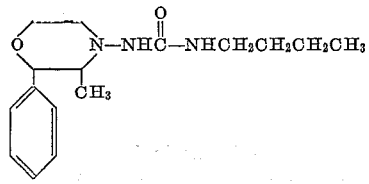

Example 23

The substitution of 5.05 parts of 3,4-dichlorophenyl isocyanate in the process of Example 19 results in N-(3-methyl-2-phenylmorpholin-4-yl) - N'-3,4-dichlorophenylurea of the structural formula

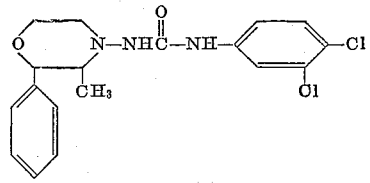

Example 24

By substituting 10.24 parts of o-ethylbenzenesulfonyl chloride and otherwise proceeding according to the processes of Example 13, 4-(o-ethylbenzenesulfonamido)-3-methyl-2-phenylmorpholine of the structural formula

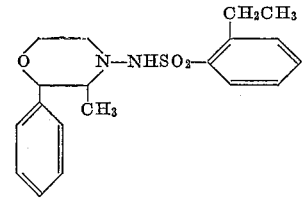

is obtained.

What is claimed is:
1. A compound of the formula

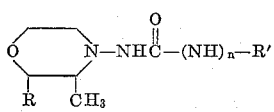

wherein R is selected from the group of radicals consisting of phenyl and cyclohexyl, R' is selected from the group of radicals consisting of phenyl, phenyl-(lower alkylene), halophenyl, (lower alkoxy)phenyl, cyclohexyl, pyridyl, and 5-methyl-3-isoxazolyl, and *n* is selected from the group of integers consisting of 0 and 1.

2. A compound of the formula

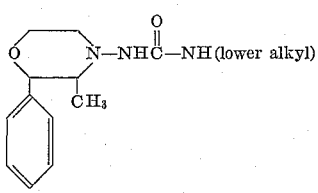

3. A compound of the formula

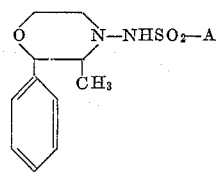

wherein A is selected from the group of radicals consisting of phenyl, (lower alkyl)-phenyl, and lower alkanoyl) amidophenyl.

4. 3 - methyl-4-(5'-methylisoxazole-3'-carboxamido)-2-phenylmorpholine.

5. 4-isonicotinamido-3-methyl-2-phenylmorpholine.

6. 4-benzamido-3-methyl-2-phenylmorpholine.

7. N - (3-methyl-2-phenylmorpholine-4-yl)-N'-phenylurea.

8. N - (3-methyl-2-phenylmorpholin-4-yl)-N'-o-chlorophenylurea.

9. N - (3 - methyl-2-phenylmorpholin-4-yl)-N'-ethylurea

No references cited.